C. A. HIRTH.
TWO-PART RACE FOR ROLLER OR BALL BEARINGS.
APPLICATION FILED MAR. 19, 1912.

1,220,633.

Patented Mar. 27, 1917.

Witnesses:
John Murtagh
L. M. Dorman

Inventor:
Carl Albert Hirth
by Goepel Goepel
Attorneys.

UNITED STATES PATENT OFFICE.

CARL ALBERT HIRTH, OF CANNSTATT-STUTTGART, GERMANY, ASSIGNOR TO NORMA COMPAGNIE G. M. B. H., OF CANNSTATT-STUTTGART, GERMANY, A CORPORATION OF GERMANY.

TWO-PART RACE FOR ROLLER OR BALL BEARINGS.

1,220,633.          Specification of Letters Patent.      Patented Mar. 27, 1917.

Application filed March 19, 1912. Serial No. 684,828.

*To all whom it may concern:*

Be it known that I, CARL ALBERT HIRTH, a citizen of the German Empire, residing at Cannstatt-Stuttgart, in the Kingdom of Württemberg, in said Empire, have invented certain new and useful Improvements in Two-Part Races for Roller or Ball Bearings, of which the following is a specification.

This invention is based on the problem of making a race in two parts for roller or ball bearings in which each part may be suitably changed and replaced by another part, without its being necessary to again adapt the two half rings to one another. In other words, it is intended to make it possible to remove from a transmission shaft for instance, a roller or ball bearing which has become defective without dismounting the shaft and to reconstruct it on the shaft from other suitable pieces taken from stock, which bearing is then capable of working perfectly without further difficulty.

This difficult problem could be solved with known means and methods if it were allowable to make the half races, which are to be put together, with flat surfaces which fit straight one on another. Unfortunately a ball race must not be divided in a plane struck through the axis of the bearing, as, when in operation, each roller with the actual supporting surface element would then entirely run simultaneously off one half race and encounter the edge of the other half race. It is better to have an oblique dividing plane, but this is insufficient for the reason that it would not prevent or limit a displacement of the half races either in a radial or in a longitudinal direction. A wedge-shaped joint would be defective because the vertex of the reëntrant angle at which the wedge-shaped edge should be laid cannot be machined with sufficient accuracy, so that precisely in the middle of the race there would be an incomplete contact.

In ball-bearings the circumstances are indeed more favorable but are similar because the contact of the balls is also not at one point. The form of race hereinafter described complies with all requirements, as in it the meeting faces of the annular parts are formed as a cylindrical surface according to a regularly curved and exactly reproducible surface.

An example of construction is shown in the accompanying drawings, in which:—

Similar letters of reference indicate corresponding parts throughout the several figures of the drawings.

Figure 1:
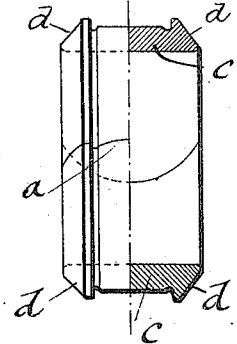
Figure 1 illustrates partly in axial section the two halves of a race of the inner ring of a roller bearing when put together.
Figure 2:
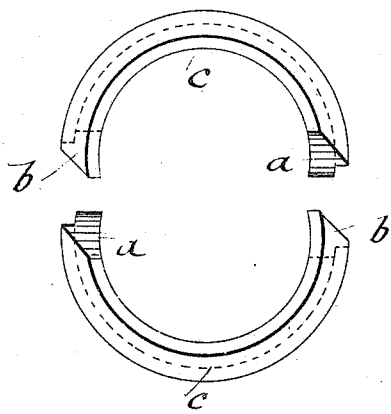
Fig. 2 is a side view of the half rings separated.
Figure 3:
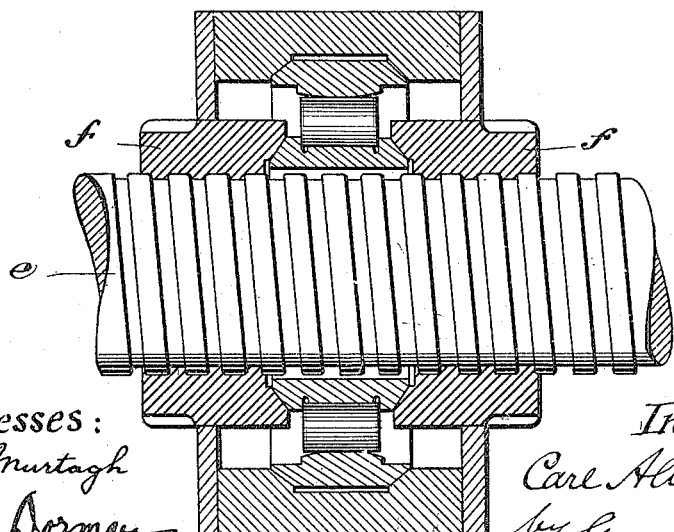
Fig. 3 represents a roller-bearing applied to a shaft.

Both halves of the race are formed identically, each part having a convex and a concave meeting face (*a* and *b* respectively), which fits into the corresponding concave and convex meeting face (*b* and *a* respectively) of the other part. The said faces have the form of cylindrical surfaces. The race surface *c* for the rollers is shown as a cylindrical surface but it might also be slightly spherical and provided with shoulders at the sides. At both sides the half rings have coned or beveled faces *d*. By means of these faces they may be pressed together by axially acting means, for instance by means of screw-rings *f* with conical seats screwed on the shaft *e* or on a sleeve on the shaft *e*.

The cylindrical meeting surfaces have particular advantages over others in that they can be ground by the face of a cylindrical grinding disk, that is to say by a surface which abrades comparatively uniformly and which can also be axially displaced during the grinding while the grinding disk may be carried on a pivotal arm of the grinding machine which in order to produce the desired curvature is adapted to turn on an axis which is fixed during the entire grinding to the annular piece clamped thereto, but is otherwise displaceable.

I claim:

1. A bearing having a two-part body, consisting of a pair of duplicate matching half-rings forming a race, each half-ring having one of its meeting faces formed to a convexo cylindrical surface, and the other meeting face formed to a concavo cylindrical surface accurately matching with the convexo cylindrical surface, each of said meeting faces of each half-ring being curved at all parts thereof to the contour of a semicircle, and said meeting faces being coaxial, and also substantially normal to the race when the corresponding abutting convexo and concavo cylindrical meeting faces are pressed tightly against each other, the center of curvature of the semicircular half-ring being substantially in the median plane of the bearing.

2. A bearing having a two-part body, consisting of a pair of duplicate matching half-rings forming a race, each half-ring having one of its meeting faces formed to a convexo cylindrical surface and the other meeting face formed to a concavo cylindrical surface accurately matching with the convexo cylindrical surface, each of said meeting faces of each half-ring being curved at all parts thereof to the contour of a semicircle, and said meeting faces being coaxial, and also substantially normal to the race when the corresponding abutting convexo and concavo cylindrical meeting faces are pressed tightly against each other, the center of curvature of the semicircular half-ring being substantially in the median plane of the bearing, inclined portions at the exterior of the half-rings which are also coaxial when the half-rings are pressed tightly against each other, and screw-rings having beveled faces pressing on inclined portions of the matching half-rings for holding them firmly together coaxially both in radial and longitudinal direction.

In testimony whereof I have affixed my signature in presence of two witnesses.

CARL ALBERT HIRTH.

Witnesses:
  PAULINE KLAIBER,
  PAULINE MÜLLER.